3,107,221
CORROSION INHIBITOR COMPOSITION

Hugh T. Harrison and Billy D. Oakes, Tulsa, Okla., assignors to The Dow Chemical Company, Midland, Mich., a corporation of Delaware
No Drawing. Filed Apr. 18, 1958, Ser. No. 729,244
5 Claims. (Cl. 252—148)

The present invention relates to inhibition of corrosion and more particularly it is concerned with new and useful compositions which may be employed in acid solutions to decrease the corrosion of metal in contact with the acid solutions.

Prior known compositions for the inhibition of corrosion of metal surfaces have in many instances employed relatively expensive chemicals. Additionally many of the most effective chemicals are unusually difficult to handle. Further, while the percent reduction in corrosion is relatively high, there is still much room for improvement to increase efficiency and safety.

It is an object of the present invention to provide a new and useful composition which substantially inhibits the solubilization (corrosion) of metals in contact with corrosive acids. It is a further object of the present invention to provide a composition for the inhibition of corrosion of metal surfaces in contact with corrosive acids which is relatively inexpensive and easily handled. An additional object of the present invention is to provide an improved corrosion inhibitor composition which is useful with aqueous mineral acids. These and other objects will become apparent from the following specification and claims directed to those skilled in the art.

It has now been found that a synergistic corrosion inhibition can be obtained by employing as the inhibitor a mixture of an amine and an acetylenic alcohol having the formula

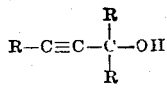

wherein each R represents hydrogen, loweralkyl, phenyl, substituted phenyl or hydroxyalkyl radical and the α R's may be joined together to form a cyclohexyl ring. The activity of the amine and acetylenic compound is effectively synergized when the amine is employed in amounts of from 10 percent to 90 percent by volume of the inhibitor composition. Good results are obtained when the inhibitor composition (the amine-acetylenic mixture) is employed in aqueous acid solutions in concentrations of from 0.05 to 1.0 percent by volume.

Various acetylenic alcohols and diols when associated with various amines and employed in accordance with the present invention are found to exhibit with the amine a synergistic effect. Thus, for example, propargyl alcohol, 1,4 - butynediol, ethynylcyclohexanol 3-methyl-1-nonyn-3 - ol, 2 - methyl-3-butyn-2-ol, α-ethynyl-2,4,6-trimethylbenzyl alcohol, 2-methyl-1-pentyn-3-ol, α-ethynylbenzyl alcohol and the like when employed in accordance with the present invention exhibit the synergistic anti-corrosion effect.

Similarly, various amines when employed in accordance with the present invention with the acetylenic alcohols exhibit a synergistic effect. Thus, for example, one can employ pyridine, alkylpyridines or mixtures thereof, the primary, secondary or tertiary aliphatic amines, such as, butylamine, dibutylamine, tributylamine, amylamine diamylamine, triamylamine and the like. The alkyl amines which have been found most effective are those having from 4 to 10 carbon atoms in each alkyl substituent. The heterocyclic amines which have been found to provide good results are the alkylpyridines, such as those commercially known as alkylpyridines HB, a mixture of alkylated pyridines having an average molecular weight of 170.

In carrying out the present invention the corrosion inhibitor is mixed with an aqueous solution of a mineral acid or with water which is thereafter mixed with the mineral acid. The inhibited acid solution may then be employed in oil-well acidizing or industrial acid-cleaning.

In a preferred manner of carrying out the present invention, the alkylpyridine and the acetylenic compound are mixed together, in the range of ratios herein before described, as an aqueous mixture, preferably with a surface-active agent. The resulting mixture is agitated to assure complete distribution of the additives in the aqueous phase. Thereafter, the desired mineral acid is mixed with this aqueous mixture to obtain inhibited acid suitable for use in oil-well acidizing or industrial acid-cleaning.

Various types of surface-active agents have been found to be effective and useful in assuring the complete dispersion of the active ingredients throughout the composition and a better contact of the inhibitor with the metallic surface. In general, any surface-active agent that is stable in aqueous acid may be used. Thus, for example, one may employ from 0.05 to 2 percent by volume an ionic or nonionic surface-active dispersing agent, such as an oxyethylated alkylphenol, ammonium alkylbenzene-para-sulfonate, dioctyl sodium sulfosuccinate, or trimethyl-stearylammonium chloride.

Various acids, particularly the mineral acids, have been found to be effectively inhibited against metal corrosion by the employment of the compositions of the present invention. Thus, sulfuric, phosphoric, acetic and hydrochloric acids and the like may be effectively inhibited when employing an acetylenic alcohol or diol in combination with an alkylpyridine.

The inhibitors of the present invention are operable when employed at temperatures as high as about 275° F. About this temperature, while some inhibition is found to exist, the corrosion rate is above that which is permissible in field operations both economically and safety-wise.

The following examples illustrate the present invention but are not to be construed as limiting.

Example 1

561 gallons of water, placed in a 1,000 gallon tank provided with an air lance was mixed with 1 gallon of the product obtained by the condensation of di-sec-butylphenol with 10 moles of ethylene oxide, 2 gallons of alkylpyridines HB (a mixture of high-boiling alkylpyridines with an equivalent weight of approximately 170, obtained from Carbide and Carbon Chemicals Company) and 2 gallons of propargyl alcohol. The resulting mixture was agitated with the aid of an air lance for approximately 15 minutes. Thereafter, continuing the agitation, 434 gallons of 32 percent hydrochloric acid was added to the mixture. The resulting mixture, 1000 gallons, was an inhibited 15 percent hydrochloric acid solution which was useful as an oil-well acidizing solution.

Examples 2–16

Various inhibitor compositions were prepared from an alkylpyridine and an acetylenic alcohol or diol and employed to inhibit 15 percent hydrochloric acid. Corrosion tests were run at 150° F. for 16 hours. The test metal was AISI 1010 and mild steel compound 2¾ inches 1 inch by 0.12 inch. The results of such tests are tabulated in the table below.

| Ex. No. | Concentration inhibitor (percent by volume) | Corrosion rate (lbs./ft.²/day) |
|---|---|---|
| | 0.4 percent alkylpyridines HB (coded HB) | 0.076 |
| | 0.4 percent 1,4-butynediol (coded BD) | 0.037 |
| | 0.4 percent ethynylcyclohexanol (coded ECH) | 0.14 |
| | 0.4 percent propargyl alcohol (coded PA) | 0.031 |
| | 0.4 percent mixture (9 parts by volume HB plus 1 part by volume BD) | 0.0063 |
| | 0.4 percent mixture (7 parts HB plus 3 parts BD) | 0.0064 |
| | 0.4 percent mixture (5 parts HB plus 5 parts BD) | 0.0074 |
| | 0.4 percent mixture (3 parts HB plus 7 parts BD) | 0.0064 |
| | 0.4 percent mixture (1 part HB plus 9 parts BD) | 0.014 |
| | 0.4 percent mixture (9 parts HB plus 1 part ECH) | 0.0036 |
| | 0.4 percent mixture (7 parts HB plus 3 parts ECH) | 0.0068 |
| | 0.4 percent mixture (5 parts HB plus 5 parts ECH) | 0.0015 |
| | 0.4 percent mixture (3 parts HB plus 7 parts ECH) | 0.0012 |
| | 0.4 percent mixture (1 part HB plus 9 parts ECH) | 0.0013 |
| | 0.4 percent mixture (5 parts HB plus 5 parts PA) (200° F.) | 0.013 |

*Examples 17–22*

The effects of various surface-active agents were determined in a similar manner employing the inhibitor at a concentration of 0.3 percent by volume. The inhibitor had a composition of 1 part by volume of propargyl alcohol and 1 part by volume of alkylpyridines HB. The test was run at a temperature of 200° F. for 16 hours. The test metal was AISI 1010 mild steel. The results of the employment of various types of surfactants is tabulated in the following table.

| Ex. No. | Concentration of surface active agent added (percent by volume) | Ionic activity | Corrosion rate (lbs./ft.²/day) |
|---|---|---|---|
| | None | | 0.016 |
| | 0.1 percent di-sec-butylphenol condensed with 10 moles ethylene oxide. | Nonionic | 0.013 |
| | 0.1 percent nonylphenol condensed with 15 moles ethylene oxide. | do | 0.015 |
| | 0.1 percent ammonium isopropylbenzene-para-sulfonate. | Anionic | 0.015 |
| | 0.1 percent dioctyl sodium sulfosuccinate. | do | 0.006 |
| | 0.1 percent trimethylstearyl-ammonium chloride. | Cationic | 0.014 |

*Examples 23–29*

Varied concentrations of the inhibitor mixture of the present invention were employed to determine the effect of concentration of the inhibitor in hydrochloric acid. The inhibitor consisted of a mixture 2 parts of alkylpyridine, 2 parts by volume of propargyl alcohol and 1 part of the condensation product of di-sec.-butylphenol with 10 moles of ethylene oxide. The test was run employing AISI 1010 mild steel coupons at 150° F. for 16 hours. The results of the test employing various concentrations of inhibitor in a 15 percent hydrochloric acid solution are tabulated below.

| Ex. No. | Concentration inhibitor (percent by volume) | Corrosion rate (lbs./ft.²/day) |
|---|---|---|
| 3 | 0.4 percent alkylpyridines HB | 0.076 |
| 4 | 0.4 percent propargyl alcohol | 0.031 |
| 5 | 0.05 percent above 2:2:1 mixture | 0.015 |
| 6 | 0.1 percent above 2:2:1 mixture | 0.0088 |
| 7 | 0.2 percent above 2:2:1 mixture | 0.0039 |
| 8 | 0.5 percent above 2:2:1 mixture | 0.0029 |
| 9 | 0.75 percent above 2:2:1 mixture | 0.0026 |
| 0 | 1.0 percent above 2:2:1 mixture | 0.0024 |

*Examples 31–41*

The following tests were run to determine the synergistic effect of various amines. 15 percent hydrochloric acid heated to 200° F. and containing one of the inhibitor compositions listed below was employed to determine the effect of the inhibitor on API N80 tubing (1 inch quarter-segment of 2.375 inch outside diameter tubing having a wall thickness of 0.187 inch). The results of such tests are tabulated below:

| Ex. No. | Concentration inhibitor (percent by volume) | Corrosion rate (lbs./ft.²/day) |
|---|---|---|
| 31 | 0.5 percent propargyl alcohol | 0.415 |
| 32 | 0.5 percent alkylpyridines HB | 0.506 |
| 33 | 0.5 percent mixture 1 part by volume alkylpyridines HB plus 1 part propargyl alcohol | 0.110 |
| 34 | 1.0 percent 2-n-amylpyridine | 0.158 |
| 35 | 1.0 percent mixture of 1 part of 2-n-amyl-pyridine plus 1 part propargyl alcohol | 0.061 |
| 36 | 1.0 percent 2-amino-2-ethyl-1,3-propanediol | 0.583 |
| 37 | 1.0 percent mixture 1 part 2-amino-2-ethyl-1,3-propanediol plus 1 part propargyl alcohol | 0.196 |
| 38 | 1.0 percent di-iso-amylamine | 0.291 |
| 39 | 1.0 percent mixture 1 part di-iso-amylamine plus 1 part propargyl alcohol | 0.048 |
| 40 | 1.0 percent tri-n-amylamine | 0.231 |
| 41 | 1.0 percent mixture 1 part tri-n-amylamine plus 1 part propargyl alcohol | 0.021 |

*Examples 41–56*

Employing aqueous 5 percent hydrochloric acid inhibited with a composition of the present invention and a standard commercial inhibitor, A30W (a corrosion inhibitor employed in the acidizing of oil wells), tests were run employing various metals to determine the effectiveness of the anti-corrosion properties on these metals. The corrosion rate of the metals after a 6-hour immersion in the inhibited acid are shown below.

| Ex. No. | Metal | Conc. inhibitor (percent by volume) | Temp. (°F.) | Corrosion rate (lbs./ft.²/day) |
|---|---|---|---|---|
| 41 | Cast iron | 0.3 percent formulation [1] | 150 | 0.163 |
| 42 | do | 0.25 percent A30W | 150 | 0.465 |
| 43 | SA83A | 0.3 percent formulation [1] | 175 | 0.0081 |
| 44 | SA83A | 0.25 percent A30W | 175 | 0.022 |
| 45 | SA335 | 0.3 percent formulation [1] | 175 | 0.023 |
| 46 | SA335 | 0.25 percent A30W | 175 | 0.023 |
| 47 | AISI 304 | 0.3 percent formulation [1] | 175 | 0.0025 |
| 48 | AISI 304 | 0.25 percent formulation [1] | 175 | 0.0033 |
| 49 | AISI 316 | 0.3 percent formulation [1] | 175 | 0.0017 |
| 50 | AISI 316 | 0.25 percent A30W | 175 | 0.0050 |
| 51 | AISI 1020 | 0.3 percent formulation [1] | 175 | 0.0049 |
| 52 | AISI 1020 | 0.25 percent A30W | 175 | 0.0067 |
| 53 | Admiralty | 0.3 percent formulation [1] | 175 | 0.0012 |
| 54 | do | 0.25 percent A30W | 175 | 0.0013 |
| 55 | Yellow brass | 0.3 percent formulation [1] | 175 | 0.0019 |
| 56 | do | 0.25 percent A30W | 175 | 0.0015 |

[1] Formulation composed of 2 parts by volume alkylpyridines HB plus 2 parts propargyl alcohol plus 1 part di-sec-butylphenol condensed with 10 moles ethylene oxide.

*Examples 57–63*

Employing various acids, tests were run to determine the effectiveness of the inhibitor compositions at 150° F. and 16 hours on AISI 1010 mild steel, the following results were obtained.

| Ex. No. | Acid media | Inhibitor concentration (percent by volume) | Corrosion rate (lbs./ft.²/day) |
|---|---|---|---|
| 57 | 5 percent sulfuric | None | 0.23 |
| 58 | do | 0.4 percent formulation A [1] | 0.070 |
| 59 | do | 0.4 percent formulation B [2] | 0.015 |
| 60 | 5 percent phosphoric | None | 0.13 |
| 61 | do | 0.4 percent formulation B [2] | 0.044 |
| 62 | 5 percent acetic | None | 0.012 |
| 63 | do | 0.4 percent formulation B [2] | 0.006 |

[1] Formulation A-2 parts by volume propargyl alcohol plus 2 parts alkylpyridines HB plus 1 part di-sec-butylphenol condensed with 10 moles ethylene oxide.
[2] Formulation B-1 part by volume ethynylcyclohexanol plus 1 part alkylpyridines HB.

We claim:
1. A metal corrosion inhibitor for use with aqueous acids which comprises an amine selected from the group consisting of pyridine, lower alkyl pyridines, alkylamines having from 4 to 10 carbon atoms, inclusive, in each alkyl substituent, and hydroxy lower alkylamines, and an acetylenic alcohol having a formula selected from the group consisting of

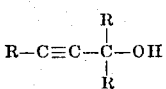

and

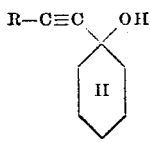

wherein each R represents a member selected from the group consisting of hydrogen, lower alkyl, phenyl, alkyl substituted phenyl and hydroxyalkyl radicals having from 1 to 4 carbon atoms, inclusive; said amine being present in an amount of from 0.1 to 10 volumes per volume of said alcohol.

2. A corrosion-inhibited mineral acid comprising an aqueous solution of mineral acid and from 0.05 to 1.0 percent by volume of a mixture consisting of from 9 to 1 parts by volume of an acetylenic hydroxy compound having a formula selected from the group consisting of

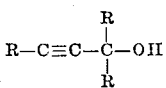

and

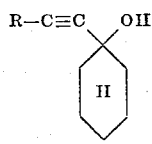

wherein each R represents a member of the group consisting of hydrogen, lower alkyl, phenyl, alkyl substituted phenyl and hydroxy alkyl radicals having from 1 to 4 carbons, inclusive, from 1 to 9 parts by volume of an amine compound selected from the group consisting of pyridine, lower alkyl pyridines, alkylamines having from 4 to 10 carbon atoms, inclusive, in each alkyl substituent, and, hydroxy lower alkylamines, and, from 0 to 2 percent by volume of a surface-active agent stable in aqueous acid.

3. A corrosion-inhibited mineral acid comprising an aqueous solution of mineral acid containing (1) from 0.05 to 1.0 percent by volume of a mixture consisting of from 9 to 1 parts by volume of propargyl alcohol and from 1 to 9 parts by volume of a mixture of alkylpyridines having an average molecular weight of 170, and (2) from 0 to 2 percent by volume of a surface-active agent stable in aqueous acid.

4. A corrosion-inhibited mineral acid comprising an aqueous solution of mineral acid containing (a) from 0.05 to 1.0 percent by volume of a mixture consisting of from 9 to 1 parts by volume of propargyl alcohol and from 1 to 9 parts by volume of alkylamine having from 4 to 10 carbon atoms, inclusive, in each alkyl substituent, and (b) from 0 to 2 percent by volume of a surface-active agent stable in aqueous acid.

5. A corrosion inhibited aqueous hydrochloric acid solution consisting essentially of about 15% by weight of HCl inhibited against corrosion by the addition thereto of a corrosion inhibiting amount of a composition consisting of equal parts by volume of propargyl alcohol and a mixture of high boiling alkyl pyridines having an equivalent weight of about 170.

References Cited in the file of this patent

UNITED STATES PATENTS

| | | |
|---|---|---|
| 2,053,024 | Dreyfus | Sept. 1, 1936 |
| 2,472,400 | Bond | June 7, 1949 |
| 2,688,368 | Rodgers et al. | Sept. 7, 1954 |
| 2,814,593 | Beiswanger et al. | Nov. 26, 1957 |
| 2,846,295 | Patterson et al. | Aug. 5, 1958 |
| 2,913,408 | Pumpelly et al. | Nov. 17, 1959 |

OTHER REFERENCES

Ito: Tar Base as Corrosion Inhibitor, article in Chemical Abstracts, vol. 50, 1956, pp. 16632 and 16633.